H. LOTTE.
WHEEL WITH MULTIPLE AND BALANCED RIMS.
APPLICATION FILED DEC. 19, 1907.
987,471.
Patented Mar. 21, 1911.
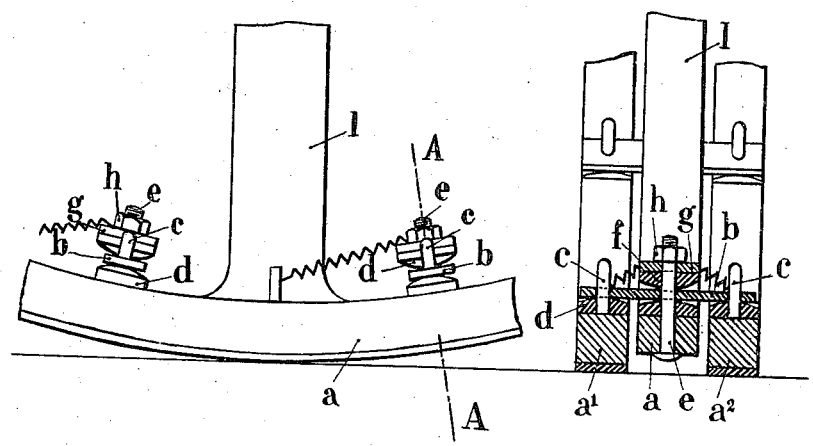
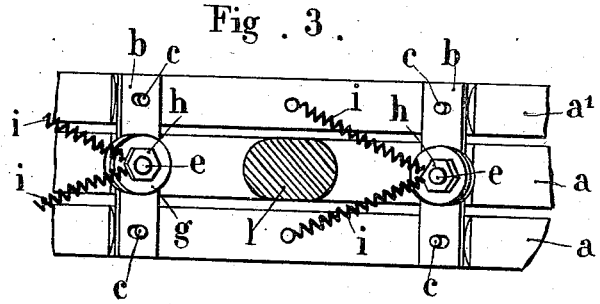
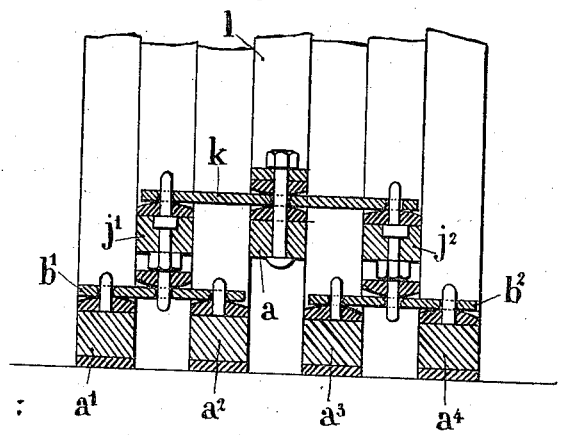
WITNESSES:
W. M. Avery
J. P. Davis
INVENTOR
Henry Lotte
BY
Munn & Co.
ATTORNEYS s
UNITED STATES PATENT OFFICE.

HENRY LOTTE, OF ST. JEAN D'ANGÉLY, FRANCE.

WHEEL WITH MULTIPLE AND BALANCED RIMS.

987,471.  Specification of Letters Patent.  Patented Mar. 21, 1911.

Application filed December 19, 1907. Serial No. 407,195.

*To all whom it may concern:*

Be it known that I, HENRY LOTTE, of 4 Rue Matha, St. Jean d'Angély, Charente-Inférieure, Republic of France, controller of direct taxes, have invented a Wheel with Multiple and Balanced Rims, of which the following is a full, clear, and exact description.

This invention relates to a wheel with multiple and balanced rims. These rims of which there may be any even number are mounted two and two upon balance-levers or beams carried either by the rim properly called or by intermediate rims carried in their turn two and two on other similar beams carried by the proper rim of the wheel. This arrangement has for its purpose: to facilitate the passing of obstacles each rim being capable of being separately displaced to pass these obstacles; to considerably diminish the height of the displacements transmitted to the hub of the wheel when running on uneven ground; and to diminish jars, as hereinafter explained.

The invention is represented, by way of example only, in the accompanying drawing in which:

Figure 1 is an elevation of a part of a wheel having two rims. Fig. 2 is a cross section made according to line A—A of Fig. 1. Fig. 3 is a plan view corresponding to Fig. 1. Fig. 4 shows in section a wheel having four of these rims.

In the example represented in this drawing, the wheel comprises two auxiliary rims $a^1$, $a^2$ mounted on beams $b$. The mounting can be effected, as represented, by means of rods $c$, secured in the rims and passing through recesses of the beam, arranged so as to allow, in all the directions, the relative displacements of the beam with reference to the rods $c$. India-rubber buffers $d$ are interposed between the beams and the rims. The beams are pivoted to the main rim $a$ mounted upon the spokes $l$ by means of bolts $e$ secured to this rim and passing through recesses of the beams similar to those of the ends. Buffers of india-rubber $f$ are placed on both sides of the beams. The whole is fastened by a washer $g$ and a nut $h$. The mounting is effected instantaneously by placing the beams simultaneously on the rods $c$ and the bolts $e$. By then putting the nuts $h$ in position, all the parts are secured in position. The rims are connected to the rim proper by springs $i$ which always tend to bring back the rims so as to cause their centers to coincide.

It will easily be understood that the rims can be independently displaced when passing over obstacles, in the vertical and horizontal directions. If, for instance the rim $a^1$ meets a rise of the ground, it is lifted, while the rim $a^2$ can at the same time roll on a horizontal plane and keep the same height. The obstacles of the road can thus influence but one of the rims. This has several advantages. Indeed, it happens rarely that practically the obstacles have a width equal to that of a wheel provided with multiple rims and therefore only one rim will be affected at a time when passing this obstacle. The displacement of one of the rims, if the other rim rolls at this moment on a rectilinear line is not integrally transmitted to the rim proper but divided into two parts on account of the intermediate action of the beam. The shocks resulting from the meeting of obstacles have less effect upon the body of the vehicle because the load of the wheel is distributed among the rims; it results therefrom that the shock of one of the multiple rims is less than if there was only a single rim. The displacements of the wheel and the shocks being respectively reduced, the jars of the carriage are considerably lessened. The smoothness of the rolling is increased and the tractive power which is necessary to draw the vehicle is diminished. Furthermore, it is to be observed that in the case where one of the rims would fall while the other is lifted, these two displacements can correct each other and the rim $a$ and the wheel will remain immovable. The rims taking at every moment levels corresponding to the outline of the ground, a large bearing surface upon the ground can be given to the wheel, which is very advantageous for the so-called heavy vehicles.

Instead of two rims, any number of rims can be adopted. Fig. 4 shows, by way of example, a wheel with four rims $a^1$, $a^2$, $a^3$, $a^4$ mounted on beams $b^1$, $b^2$, carried themselves by intermediate rims $j^1$, $j^2$; these rims are mounted on a beam $k$ mounted on the principal rim $a$. In this case, the displacements of one of the rims and the power of the shocks it receives are transmitted to the body of the vehicle only when divided by four. Any even number of rims can be combined in the same way according to the weight of the vehicle supported.

The above arrangements are given by way of example only; the forms, dimensions, and details can vary according to circumstances without departing in any way from the principle of the invention.

Claims:

1. In a wheel, the combination with the rim, of auxiliary rims, beams centrally pivoted upon the main rim, and means for loosely connecting the auxiliary rims with the ends of the said beams.

2. In a wheel, the combination with the rim, of auxiliary rims, pivoted beams having openings in their ends, and pins carried by the auxiliary rims and engaging the openings in the beams.

3. In a wheel, the combination with the rim, of a pair of auxiliary rims at each side of the main rim, beams pivoted upon the main rim, and means for loosely and pivotally connecting each pair of auxiliary rims with the ends of the beams.

4. In a wheel, the combination with the rim, of a pair of auxiliary rims at each side of the main rim, beams loosely connecting each pair of auxiliary rims, beams pivoted to the main rim, intermediate rims, and means for connecting the intermediate rims with the beams on the main rim and the beams connecting the pairs of auxiliary rims.

5. In a wheel, the combination with the rim, of a pair of auxiliary rims at each side of the main rim and each carrying pins, beams having openings at their ends receiving the pins of the auxiliary rims, and openings intermediate of their ends, beams pivoted upon the main rim and having openings in their ends, and intermediate rims carrying pins on their opposite sides engaging the openings in the beams of the main rim and the central openings of the beams connecting the pairs of auxiliary rims.

6. A wheel having a main rim, an auxiliary rim on each side, articulated beams carried by the main rim and elastic intermediates interposed between the beams and each of the rims.

The foregoing specification of my "wheel with multiple and balanced rims", signed by me this sixth day of December 1907.

HENRY LOTTE.

Witnesses:
HANSON C. COXE,
MAURICE H. PIGNET.

---

Copies of this patent may be obtained for five cents each, by addressing the "Commissioner of Patents, Washington, D. C."